No. 653,633. Patented July 10, 1900.
G. W. WALTENBAUGH.
VARIABLE SPEED GEARING.
(Application filed Jan. 29, 1900.)
(No Model.) 3 Sheets—Sheet 1.
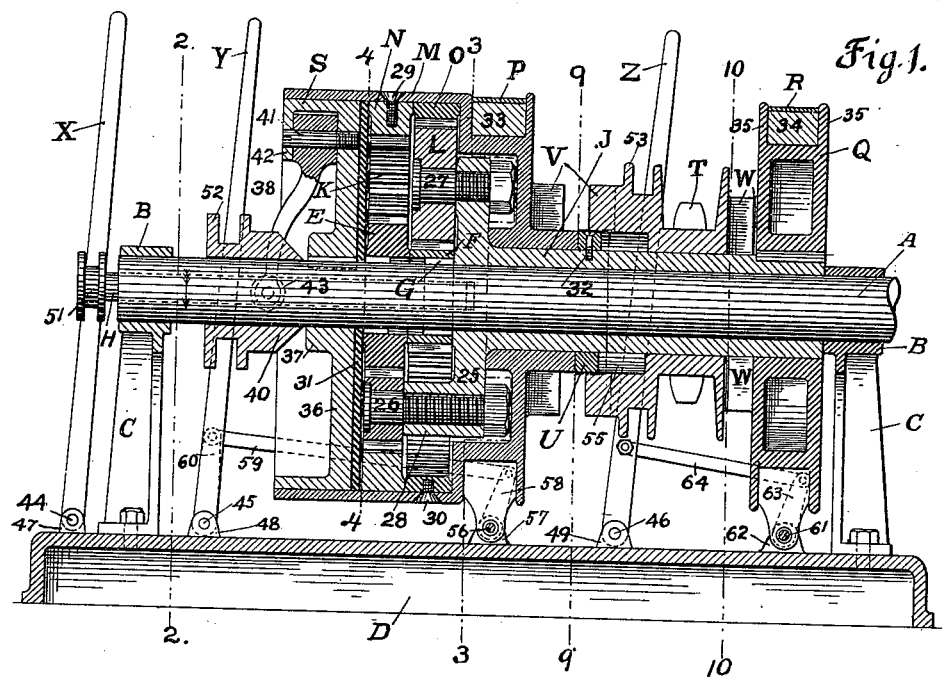
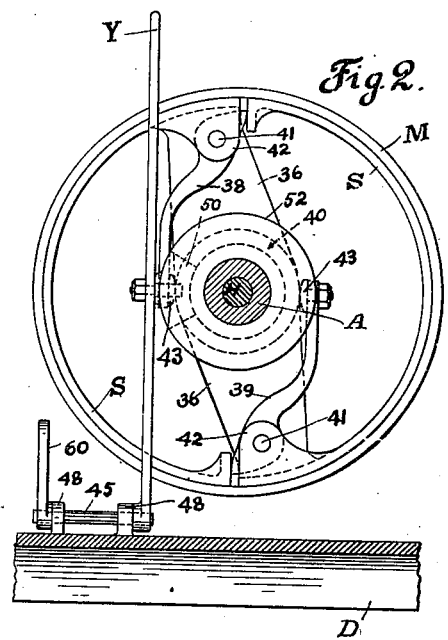
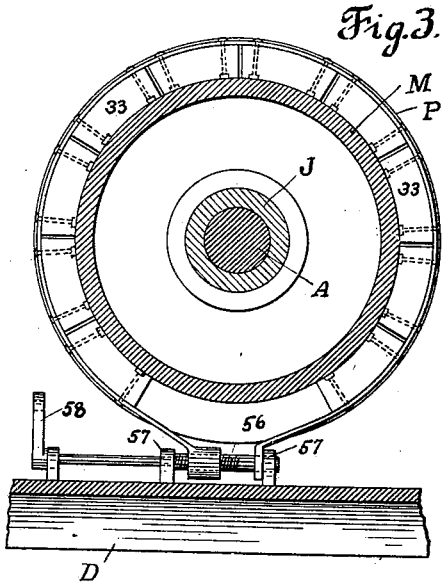
Witnesses
Alex Hildebrand
J. M. Ough
Inventor
George W. Waltenbaugh
by A. H. Ste. Marie atty No. 653,633. Patented July 10, 1900.
G. W. WALTENBAUGH.
VARIABLE SPEED GEARING.
(Application filed Jan. 29, 1900.)
(No Model.) 3 Sheets—Sheet 2.
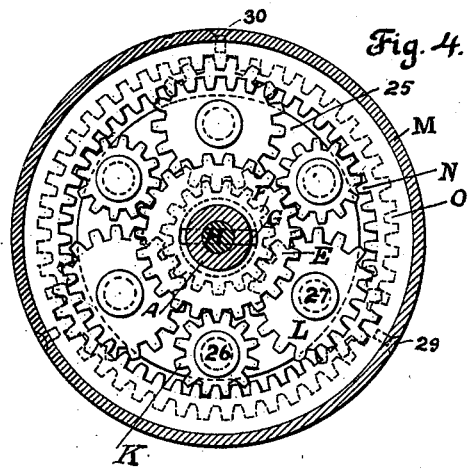
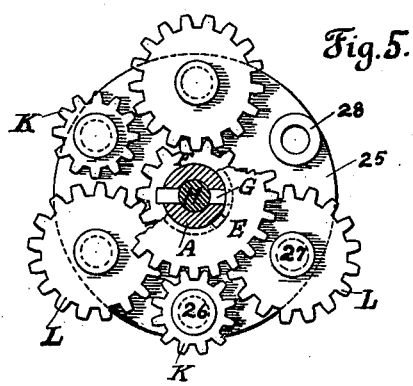
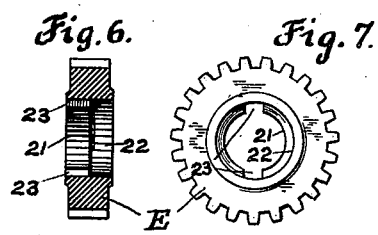
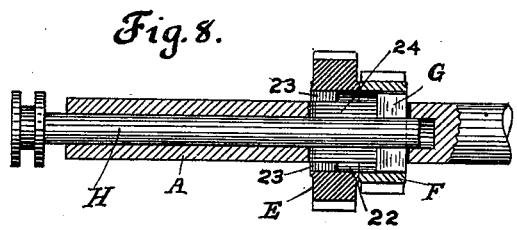
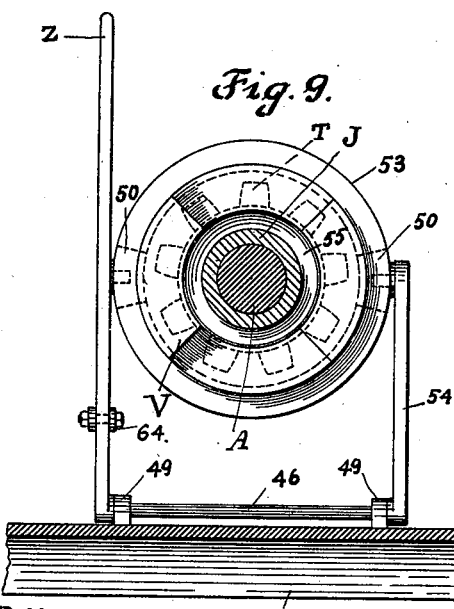
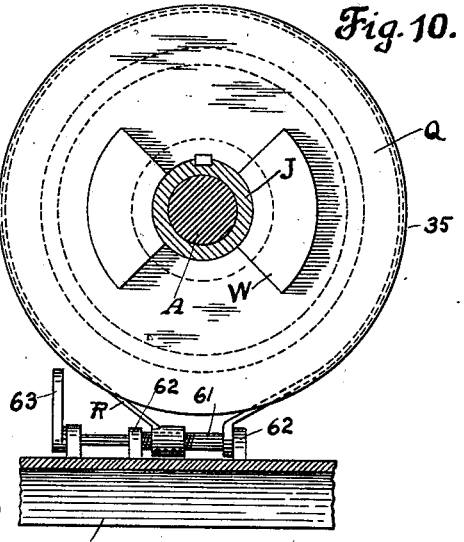
Witnesses
Alex. Hildebrand.
J. M. Ough.
Inventor
George W. Waltenbaugh
by A. H. Ste. Marie
atty

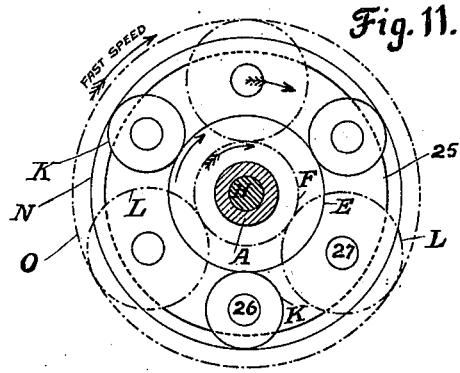
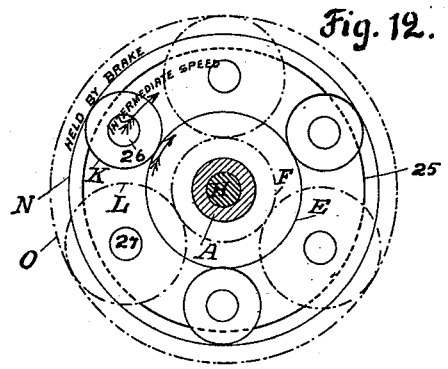
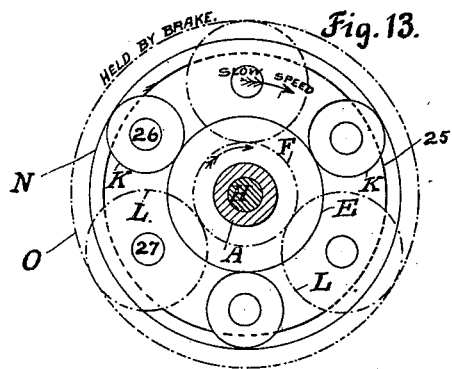
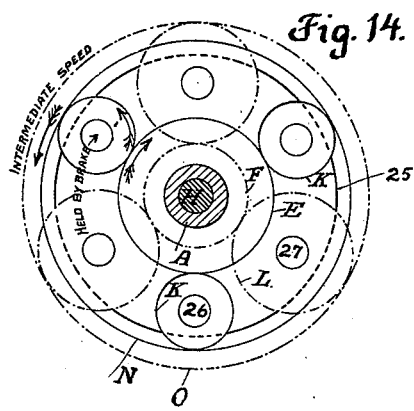
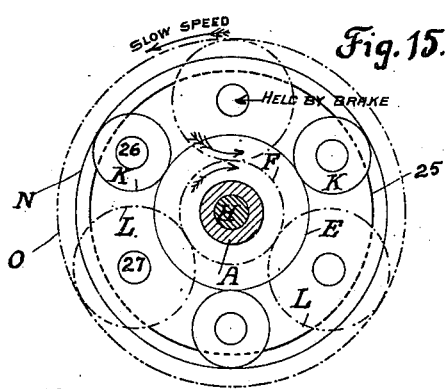

UNITED STATES PATENT OFFICE.

GEORGE W. WALTENBAUGH, OF SAN FRANCISCO, CALIFORNIA, ASSIGNOR OF ONE-HALF TO JOSEPH M. OUGH, OF SAME PLACE.

VARIABLE-SPEED GEARING.

SPECIFICATION forming part of Letters Patent No. 653,633, dated July 10, 1900.

Application filed January 29, 1900. Serial No. 3,225. (No model.)

*To all whom it may concern:*

Be it known that I, GEORGE W. WALTENBAUGH, a citizen of the United States, and a resident of the city and county of San Francisco, in the State of California, have invented a new and useful Variable-Speed Gearing, of which the following is a specification.

The object of my invention is to provide an improved gearing capable of transmitting power and motion in any desired direction with different ratios of speed from a rotary shaft that may turn continuously in one direction at a uniform rate of speed. By "rotary shaft" is here meant the driving-shaft of any known type of engine or motor, whether the same be worked by steam, vapor, electricity, water, or other agent or active force. No restriction is contemplated as to the direction in which such shaft should rotate when saying that it may turn continuously in one direction while the gearing will transmit its power and motion in any direction as desired, and speaking of the shaft's uniform rate of speed does not signify that its speed may not be altered. The idea which it is intended to express and to have distinctly understood is that I aim to provide a gearing so designed and constructed that the shaft to which it is applied need not, though it may, be reversed and will be able to turn in a chosen direction without stopping, even if the part driven thereby through the said gearing will at times move in the same direction and in the reverse at other times, and, further, that the speed selected for the shaft can be maintained at all speeds of the driven part.

It is my object to produce a gearing, as defined above, in such form or forms as will be found the simplest and most effective both from the theoretical standpoint of the engineer and the viewpoint of the practical machinist—a gearing that, to state it in as few words as possible, can be relied on to do the following—to wit, transmit directly from one shaft only, without counter-shaft, or minus the interposition and aid of extraneous or complicated contrivances; evolve for the driven part all speeds, from naught to the highest obtainable, from the single shaft running at uniform speed; secure various degrees of purchase, from the normal to the greatest available for a given purpose, by varying the speed of the driven part without affecting that of the driving-shaft, so that the latter will exert its full power and have its full rotary effect at the slowest speed of the former; afford complete control over the driven part to this extent that it and the gearing will be free and independent normally, that connection between the shaft, gearing, and driven part may be effected readily, that there can be easy transition from one condition to another as the several degrees of speed and purchase are developed, and that instantaneous disengagement and disconnection will be provided for, and, finally, obviate the deficiencies of devices that have been proffered for similar or analogous purposes and insure all the advantages of a superior construction. The gearing hereinafter described and claimed I believe fully accomplishes this object.

In describing the construction and working of my aforesaid improvement in gearing I shall refer to the drawings accompanying this specification, which are an integral part hereof, and in which—

Figure 1 is a sectional elevation of what I consider the most useful and desirable form of gearing in which my said invention is presently embodied. Figs. 2, 3, and 4 are cross-sections on similarly-numbered lines of the said Fig. 1. Figs. 5, 6, 7, and 8 are detailed views of certain parts of the gearing and of the shaft to which the same is applied. Figs. 9 and 10 are transverse sections also taken from correspondingly-numbered lines of Fig. 1; and Figs. 11 to 15, inclusive, are diagrams illustrating the diverse modes of operation of which the gearing is susceptible or capable, Figs. 11, 12, and 13 showing how it is worked to produce different movements in one direction, and Figs. 14 and 15 indicating how it is operated for other movements in a reverse direction.

Similar letters and numerals of reference designate similar parts in all the figures.

My improved gearing is applicable to a driving-shaft of any size—such, for example, as is designated by the letter A in the said drawings—and the said shaft can be located in any convenient place, mounted in any approved way or position, and rotated by any suitable power. As shown in Fig. 1 of the drawings, it is journaled in bearings B at the upper ends of standard C, bolted to a base D; but other bearings and supports may be substituted for the foregoing. If desired, the said shaft may be turned alternately in opposite directions or reversed as often as may be required, and it may also be driven at various regular or irregular rates of speed; but my invention will permit it to revolve continuously in a single direction—for instance, in the direction indicated by the arrow in said Fig. 1—and at a constant speed, notwithstanding that the direction and rate of motion of the part driven from it may be changed at pleasure, as will hereinafter appear, in accordance with the object of my said invention.

The principal parts of the gearing in the form of my invention presently described are the following—viz., two pinions E F, loosely mounted on the driving-shaft A and adapted to be fixed thereon by means of a key G, having a stem H longitudinally movable within the said shaft; a sleeve J, also loose on the said shaft and carrying two trains of gears K L in mesh with the two said pinions; a barrel M, having internal gears N O likewise meshing with the said two trains of gears; a brake P, that can be applied to the said barrel, while the said sleeve is free to turn; a friction-drum Q, keyed to the sleeve J and adapted to hold it stationary through the agency of a brake R when the barrel M is released by the brake P and is in turn free to revolve, and a friction-clutch S, secured to the shaft A and adapted to couple the same with the barrel M when neither the brake P nor the brake R aforesaid is applied. The part to which the power and motion are transmitted from the driving-shaft through the gearing is indicated by the letter T and consists of a wheel, hereinafter referred to as the "driven wheel" or "driven part," loosely mounted and laterally slidable on the sleeve J, between the friction-drum Q and a collar U, fastened to the said sleeve close to the barrel M. The wheel T, which may be a sprocket-wheel, as shown, or any other desired form of gear-wheel or band-wheel, is adapted to be coupled as it is slid on the sleeve J with either the barrel M or the drum Q through the medium of jawed clutches V W. The several parts are operated by levers X Y Z and connections, all of which will be specifically described hereinafter.

The pinions E F, first-above mentioned as being part of the gearing, are placed close to each other on the driving-shaft, and, as before stated, are loose on it normally. They each have two central holes 21 22, of different diameters, and oppositely-located notches 23 in the edge of the smaller one of said holes, as shown in Figs. 1, 6, 7, and 8. Both are alike, with the exception that they are made of different sizes, and are so located on the driving-shaft as to bring the larger holes 22 together on the inside and have the smaller holes 21 with the notches 23 thereof on the outside. Within the said pinions is placed the key G, by means of which either of them can be fixed to the shaft A. This key is dropped in and arranged to move along a keyway 24, provided in the said shaft and covered by the pinions E F. Its length, width, and thickness are so proportioned that it will fit not only in the inner holes 22 of the said pinions, but will also be able to enter the notches 23 of the outer holes 21 when shifted either to the right or to the left. It is shifted, whenever required, by the stem H, to which it is secured and which slides in an axial hole or groove made in the driving-shaft, the latter being hollowed out at one end for the purpose. When pushed to the right, as seen in Figs. 1 and 8, the key G will be inserted in the notches 23 of the pinion F and will therefore engage the said pinion. If the said key be withdrawn toward the center of the two pinions E and F, so as to lie within the annular recess formed by the holes 22 thereof, neither of the said pinions will be engaged. Pulling out the said key to the extreme left will enable it to engage the pinion E by entering the notches 23 in the same. It will thus be seen that when the key G is centrally placed within the holes 22 of the pinions it is inoperative, in so far as in that case it can only revolve with its stem H and the shaft A, across which it lies; but when it is shifted either to the right or to the left in such a way as to enter the notches 23 in the holes 21 of either one of the pinions E F then whichever pinion becomes thereby engaged is rigidly secured to the shaft and forced to turn with it and the key until the key is withdrawn. Either pinion can therefore be detachably "keyed on," so to say, to the driving-shaft and caused to revolve therewith. When thus keyed on, either pinion E or F will travel with the driving-shaft at the same axial speed and will in consequence be adapted to transmit power and motion therefrom to its connected train of gears at its own circumferential speed, whatever that may be.

Adjoining the pinions E F on the shaft A is the sleeve J, which is fitted loosely on said shaft and extends thereon from the said pinions to the shaft's right bearing B. This sleeve has a flange 25, which is preferably made circular, as shown in Fig. 5, and carries the two trains of gears K L. The gears K L are placed in adjacent parallel planes, so they will respectively mesh with the pinions E F, and to this end they are mounted loosely on two alternate series of shouldered bolts 26 27, which are the pivots for the said gears. These bolts, as may be seen by reference to Fig. 1, are of two different lengths in order that each series of them may bring its respective set or train of gears into its proper plane. The longer bolts 26 pass through the flange 25 of sleeve J through bosses 28, projected laterally from the said flange, and hold the gears K. One of these gears K is omitted from Fig. 5 in order to show one of the said bosses 28 in front elevation. The shorter bolts 27 are simply passed through the flange 25 aforesaid and hold the gears L. It will be observed that the gears K are smaller than the pinion E and the gears L larger than the pinion F, which they respectively engage.

Meshing, respectively, with the two trains of gears K L, above described, are the two internal gears N O, which the barrel M carries. These internal gears are firmly fastened to the inner surface of said barrel by screws 29 30, any suitable number of which may be used. The barrel M is closed at one end on the right, where it is fitted over a portion of the sleeve J, inclosing the flange 25 thereof. Thence it extends up and to the left of said flange, over the trains of gears supported from the same, and over beyond the friction-clutch S, inside of which is located a plate 31, covering the internal gears N O, pinions E F, and intermediate gears K L. The clutch S, which is secured to the shaft A, as before noted, close to the plate 31, and the collar U, which is held to the sleeve J by one or more screws 32 next to that part of the barrel M where the said sleeve enters, combine and help to keep the said barrel and the several parts therein in their true and proper relative position on and about the driving-shaft A. The plate 31 covers all of the gearing that is placed in the barrel, excluding dust therefrom and retaining the oil or grease which is poured or placed in said barrel for the purpose of lubricating said gearing. By referring to Figs. 1 and 4 it will be seen that the two said internal gears N and O are of relatively-different diameters, the smaller internal gear N meshing with the train of small gears K and through the latter with the large pinion E and the larger internal gear O engaging the train of large gears L and through the same the small pinion F.

P and R are band-brakes which I provide for the barrel M and sleeve J and which may be employed to hold either one of them in fixed position while the other is left free to revolve in one direction or the other with the gears thereto connected whenever the key G engages either the pinion E or the pinion F and the shaft A is turning. The brake for the barrel consists of the band marked P and of a number of shoes 33, that are bolted to the inside of said band and placed with it in a suitable circumferential depression or groove provided around the exterior of said barrel, as shown in Figs. 1 and 3. The brake for the sleeve is likewise composed of the band marked R and shoes 34, bolted to said band and placed with the same around the friction-drum Q, which, as already stated, is keyed to the said sleeve. The latter-named brake is kept in place on said friction-drum by side flanges 35. (See Figs. 1 and 10.) The means for operating the two said brakes will be described farther on.

When neither one of the brakes P R is in use, the barrel M may then be coupled directly to the driving-shaft by means of the clutch S, hereinbefore mentioned. This is a friction-clutch consisting, as shown in Figs. 1 and 2, of two expansible half-rings S S, projected from opposite sides of a cross-piece or plate 36 at the ends thereof and running around close to the inner surface of the barrel M. The cross-piece 36 has a hub 37 keyed to the shaft A and revolves with the said shaft, together with the said half-rings, whether expanded or unexpanded. If these half-rings are left in their normal position or unexpanded, they will not touch or affect the barrel, which in that case may remain stationary. If, on the contrary, they are forced outward or expanded, they will then rub or bind against the said barrel and cause it to turn with them and the shaft A, to which the plate 36, that carries them, is keyed. To expand the half-rings aforesaid, I provide two levers 38 39, the points or short arms of which are brought to bear against the loose ends of said half-rings and the long arms of which are forced apart by a sliding circular wedge or conical collar 40, that is slipped on the driving-shaft next to the plate 36. The levers 38 39 are held by and oscillate on pivots 41, passed through the said plate 36 and through lugs 42, projecting inward from the half-rings S. At their inner ends the said levers carry small bolts 43, that bear on the sides of the wedge or collar 40 and are used to throw out the said levers farther apart as the clutch S becomes worn by friction against the inner surface of the barrel.

The driven wheel (represented by T) is mounted on the sleeve J between the friction-drum Q and collar U, secured to said sleeve. It is loose normally and can slide sidewise on the sleeve toward either the barrel M or the drum Q, to either of which it can be coupled by the jawed clutches V and W. These clutches, as shown in Figs. 1, 9, and 10, consist of interlocking fan-shaped projections provided at suitable places on both sides of the wheel T and on the sides of the barrel M and drum Q, that face the same. When coupled with either the barrel M or the drum Q of the sleeve J, the wheel T will partake of their movement and revolve in one direction or the other and with more or less speed, according as the said barrel and sleeve may turn themselves, as will be readily understood.

Various means may be employed for working the key, clutches, and brakes hereinbefore described. I make use of the three levers X Y Z to do this in the present form of my invention as the same is illustrated in the drawings hereto annexed; but let it be understood that no limitation as to the nature of the operating mechanism that should be used for my invention is thereby meant, admitted, or conceded. Other means for operating the said key, clutches, brakes, and related parts may be substituted for the levers X Y Z and their connections. The said levers and connections, then, are merely presented as one simple form of operating means for my improved gearing. As shown, the three levers X Y Z are made substantially alike and applied substantially in the same manner. Thus all three levers are pivoted or hinged to the base D, each being attached to a pivot-pin or rocking shaft 44 45 46, fitted or journaled in lugs 47 48 49 on the said base. Each one of said levers has attached to it and is adapted to move a shifting block 50, such as is shown in dotted lines in Figs. 2 and 9, and fitted in a well-known manner in a groove of the object or part that is to be shifted. The lever X is arranged to work upon in this way a collar or head 51, secured to the outer end of the stem H, and through said stem to slide the key G into any position in which it may be desired to place it. The lever Y will operate on a similar head 52, formed on the wedge or cone 40, operating through it the clutch S. The lever Z will work upon a similarly-shaped part 53, formed on the left side of the driven wheel T, and by sliding said part will slide with it the said wheel and subject it to the action of either the clutch V or the clutch W. Two shifting blocks are provided for the wheel T, the same being placed on opposite sides of the part 53, as indicated in Fig. 9—one attached to the lever Z aforesaid and the other one attached to a supplementary lever 54, secured to the shaft 46 of said lever Z. These oppositely-located blocks and levers insure steadiness and positive movement of the driven wheel when sliding either way on the sleeve J. The part 53 also has an annular recess 55 made in it, which allows it to slide over the collar U and the end of the barrel M that surrounds the left end of the sleeve J when the wheel T is pushed to the left to be driven by the clutch V. (See Figs. 1 and 9.) The brakes P and R, that have been previously described, are respectively operated by the levers Y and Z through connections as follows: A screw-rod 56 is passed through lugs 57 on the base D and through the ends of the band P, and to the said screw-rod is fastened a short lever or arm 58, pivotally connected by a bar 59 with a similar lever or arm 60, secured to the shaft 45 of the lever Y. A similar screw-rod 61 is placed in lugs 62 on the said base and passes through the ends of the band R, and to this screw-rod 61 is also secured a short lever or arm 63, pivotally connected by a bar 64 with the lever Z. These connections appear in Figs. 1, 2, 3, 9, and 10. The two screw-rods 56 and 61 and one end of each one of the bands P and R through which they run are so threaded that the said bands will be closed or tightened when the levers move to the left and opened or loosened when said levers move to the right. This is done so that the application of the brakes and clutches will be properly timed, the idea being to provide for the withdrawal of the brake P while the friction-clutch S is applied and the reverse and likewise to make sure that the brake R is withdrawn while the driven wheel T is engaged by the friction-drum Q, and vice versa. The several clutches and brakes will thus work in harmony. While the levers Y and Z are in a median or vertical position, neither the clutches nor the brakes are applied. This is the neutral position of the said levers. So is the lever X in a neutral position, as may be here noted, when it stands vertical, as then the key G is within the central recess 22, provided for it in the pinions E F.

The gearing hereinabove described can be put to a variety of uses, as will be quickly perceived by persons skilled in the art to which my invention appertains. It will therefore be sufficient in order to convey an adequate idea of its working to describe it as applied to an automobile or motor-carriage. Assuming, then, that the said gearing is applied to the driving-shaft of an engine or motor used for propelling such a carriage, and assuming, further, that the driven part thereof is a sprocket-wheel, as T, connected by a sprocket-chain to a corresponding sprocket-wheel secured to the axle for the driving-wheels or to the driving-wheels of said carriage, the operation of said gearing will be as follows:

We will first suppose that the carriage is standing still and it is desired to start slowly, the driving-shaft A being in motion. Follow then these directions: Move the left lever X to the extreme right, thereby connecting the shaft A through the key G with the pinion F. Next throw the right lever Z to the extreme right also, causing the sprocket-wheel T to become locked with the sleeve J through the drum Q and clutch W. Then push the middle lever Y to the extreme left, thus applying the brake P to the barrel M, bringing said barrel to rest, and therefore holding the internal gear O therein stationary. The power transmitted from the shaft A to the pinion F will now set the train of gears L in motion and cause them to climb around the internal gear O, carrying with them the pivots or bolts that secure them to the sleeve J and forcing said sleeve, together with the sprocket-wheel T, in clutch with the drum Q thereof, to turn around also on the shaft A and in the same direction as said shaft, but at a reduced rate of speed. In this case the proportion will be about one turn of the sleeve and sprocket-wheel to five and one-fifth turns of the driving-shaft, basing these figures on the relative sizes of the gears herein shown. The carriage, whose axle is connected with the sprocket-wheel T, will in consequence move at a slow speed in the direction in which the driving-shaft runs, if the connection be direct, as usual. This part or phase of the operation is illustrated by diagram in Fig. 13. Supposing, secondly, that one wishes to travel at a higher, but not the highest, rate of speed, the carriage having ascended, let us say, the abruptest part of a steep hill and the desire being to go up faster to the top of the hill, the directions in such a case are the following: Bring the lever Y to its median or neutral position, loosening the brake P, move the lever X to the extreme left, connecting the driving-shaft with the pinion E by means of the key G, and again push the lever Y to the extreme left to apply again the brake P to the external surface of the barrel M and bring it to rest, as before, holding the internal gear N therein in a fixed position. The sprocket-wheel T being in clutch with the drum Q of the sleeve J, as in the preceding case, the power will this time be transmitted to it and the vehicle thereto connected through the pinion E and train of gears K, acting on the sleeve J and causing said sleeve once more to revolve in the same direction as the shaft A at an accelerated rate of speed, which, basing our calculations on the relative sizes of gears now called into action, should equal one-half the speed of said shaft. This second phase or part of the operation is illustrated diagrammatically at Fig. 12. In the third place, supposing the automobile is on a level road and is to be driven at full speed, proceed then in the following manner: Leave the key G in whichever pinion E or F that it may be engaging at the time or cause it to engage either pinion by placing the lever X in the required position to the right or left. Keep also the sprocket-wheel T in clutch with the drum Q of the sleeve J or place it there by moving the lever Z to the right, as in the two previous cases, and throw the lever Y to the extreme right, forcing the wedge or cone 40 between the inner ends of the levers 38 39, which in turn force apart or expand the half-rings of the friction-clutch S, and lock the barrel M to the driving-shaft A through the said friction-clutch. By so doing the keyed pinion, the train of gears in mesh therewith, and the internal gear engaging the said train will all become locked together and all will revolve simultaneously with the driving-shaft, carrying around with them the sleeve J, drum Q, and sprocket-wheel T in the same direction and with the same axial speed as the said shaft, thereby moving the automobile with the fastest speed. The diagram Fig. 11 illustrates this third phase or part of the operation.

The carriage can be stopped by placing either one of the three levers X Y Z in a vertical or neutral position, thus either disengaging the key from the pinions or leaving the barrel loose or throwing the sprocket-wheel out of clutch. The carriage will then be disconnected from the driving-shaft, which may keep on revolving, but cannot transmit any power.

To reverse the movement and move the carriage backward—for instance, to clear an obstruction on a road otherwise good and level—push the lever X to the extreme left, so as to shift the key G into the pinion E, keep the lever Y in its neutral position in order to have the barrel M entirely free from either the friction-clutch S or brake P, and throw the lever Z also to the extreme left, so that the driven wheel T will be in clutch with the said barrel, causing at the same time the brake R to tighten on the friction-drum Q, which will bring the sleeve J to rest and immovably fix the center of the shouldered bolts that pass through the flange thereof and on which the two trains of gears K L are hung. The power being applied through the pinion E to the train K of the two said trains of gears, the said train K will cause the internal gear N of the barrel M to move backward on it, and thereby reverse the movement of said barrel, causing it to revolve in the opposite direction from that of the shaft A and with lesser speed. Now as the sprocket-wheel T is in clutch with the barrel M it will revolve also oppositely to the driving-shaft, and the carriage moved thereby will be going backward. (See Fig. 14 for a diagrammatic illustration of this other part or phase of the operation.) If it is desired to go backward still slower—for instance, to back out of a hole or of some difficult place—bring the lever Z to its neutral position, shift the key G into the pinion F by pushing the lever X to the extreme right, keep the lever Y vertical, and throw back the lever Z to the extreme left to have the sprocket-wheel T again in clutch with the barrel M. The power will then be applied to the train of gears L through the pinion F, and the internal gear O will be moved backward around it with the barrel M at a diminished rate of speed, consequently turning back the driven wheel at the same rate, backing the carriage slowly, but with great force, and extricating it if it be stuck. Reference is to be had to Fig. 15 for an illustration of this additional phase or part of the operation.

Should an accident occur and the pinions or gears become individually inoperative—for instance, by breakage or injury to them through any cause whatever—the carriage could still be driven at various rates of speed through the action of the friction-clutch S, the same retaining its capacity of transmitting power directly from the driving-shaft A. By pushing the lever Y slowly to the right the friction-clutch would be gradually expanded within the barrel M and operate to couple the driving-shaft by degrees to the barrel, which would lock the gears, as previously described, and turn the sprocket-wheel T through the drum Q of the sleeve J. The expansion of the clutch being gradual, it would bring the rotative speed of the barrel, and hence of the driven part, slowly up to the rotative speed of the driving-shaft, it being understood that this would be accomplished by slippage of the clutch in the barrel. By handling the friction-clutch in this manner the carriage could be started without shock and driven at any desired speed without calling into action any particular train of gears separately.

Having described my invention, what I claim, and desire to secure by Letters Patent of the United States, is—

1. The combination with a single driving-shaft that may turn continuously in a chosen direction, of a loose sleeve and a loose barrel, gearing permanently connecting the sleeve and barrel with each other and detachably with said shaft, a loose wheel, means for rigidly connecting said loose wheel with the said sleeve, and means for positively connecting the shaft and barrel to cause them to turn together in the same direction, substantially as described.

2. The combination, with a single driving-shaft that may turn continuously in one direction, of a loose barrel and a loose sleeve, gearing permanently connecting the sleeve and barrel with each other and detachably with said shaft, a loose wheel, means for rigidly connecting said loose wheel with said sleeve, and means for holding said barrel stationary while the shaft is turning, substantially as described.

3. The combination, with a single driving-shaft that may turn continuously in a given direction, of a loose sleeve and a loose barrel, gearing permanently connecting the sleeve and barrel with each other and detachably with said shaft, a loose wheel, means for coupling said loose wheel with said barrel, and means for holding said sleeve stationary while the shaft is turning, substantially as described.

4. A variable-speed gearing consisting of a shaft, a detachable pinion on said shaft combined with a sleeve loosely mounted on said shaft, a gear carried by said sleeve and geared with said pinion, a barrel, an internal gear-wheel carried by said barrel and in mesh with the gear of said sleeve, means for positively connecting said barrel with said shaft so they will turn together, a loose wheel, and means operating to turn said loose wheel with said sleeve, substantially as described.

5. The combination, with a rotary shaft, of a detachable pinion thereon, a sleeve loosely mounted on said shaft, one or more gears carried by said sleeve and in mesh with said pinion, a barrel loosely mounted on said sleeve, an internal gear-wheel carried by said barrel and engaged by said gear or gears, a loose wheel, means for rigidly connecting said loose wheel with the sleeve, and a brake for holding the barrel with its internal gear-wheel stationary while the other gears and shaft are turning therein, substantially as described.

6. The combination, with a rotary shaft, of a detachable pinion thereon, a sleeve loosely mounted on said shaft, one or more gears carried by said sleeve and in mesh with said pinion, a barrel loosely mounted on said sleeve, an internal gear-wheel carried by said barrel and engaged by said gear or gears, a loose wheel, means for coupling said loose wheel with said barrel, and a brake operating to hold the sleeve stationary while the barrel and internal gear-wheel revolve around its gear or gears oppositely to the shaft and pinion, substantially as described.

7. A variable-speed gearing consisting of a single driving-shaft that may run continuously in one direction, a detachable pinion thereon, a sleeve loosely mounted on said shaft next to said pinion, a set of gears carried by said sleeve and meshing with the same, a barrel loosely mounted on said sleeve, an internal gear-wheel carried by said barrel and engaged by said gears, a sprocket-wheel loosely mounted on said sleeve next to said barrel, a clutch adapted to couple the barrel with the driving-shaft, a brake applicable to the barrel, a brake applicable to the sleeve, and clutches for rigidly connecting the loose wheel with either the barrel or the sleeve, substantially as and for the purposes described.

8. A variable-speed gearing comprising a driving-shaft that may turn continuously in a single direction, two or more pinions loosely mounted thereon, means for rigidly securing either of said pinions to said shaft, a sleeve also loosely mounted on the shaft, gears carried by said sleeve and in mesh with said pinions, a barrel, internal gears carried by said barrel and engaging the gears of said sleeve, means for connecting said barrel directly with said shaft and causing it to turn in the same direction, a loose wheel, and means for rigidly securing said loose wheel to said sleeve, substantially as described.

9. The combination, with a rotary shaft, of two or more pinions loose thereon, a sleeve loosely mounted on said shaft, gears carried by said sleeve and in mesh with said pinions, a barrel, internal gears carried by said barrel and engaged by the gears of said sleeve, a loose wheel, means for fixing either one of said pinions to the shaft, means for rigidly connecting said loose wheel with the sleeve, and means for holding the barrel and its internal gears stationary while the sleeve is turning, substantially as described.

10. The combination, with a rotary shaft, of detachable pinions thereon, a sleeve loose on said shaft, gears carried by said sleeve and in mesh with said pinions, a barrel, internal gears carried by said barrel and engaged by the gears of said sleeve, a loose wheel, means for fixing one of the pinions to the shaft, means for coupling the loose wheel with the barrel, and means for holding the sleeve stationary while the barrel and its internal gears revolve around the gears of the sleeve oppositely to the shaft and fixed pinion, substantially as described.

11. A variable-speed gearing consisting of a single driving-shaft that may run continuously in a chosen direction, detachable pinions on said shaft, a sleeve loosely mounted on said shaft next to said pinions, gears carried by said sleeve and respectively in mesh with them, a barrel, internal gears carried by said barrel and respectively engaged with the gears of said sleeve and through them with the detachable pinions, a friction-drum secured to the sleeve, a loose wheel also mounted on the sleeve and laterally slidable thereon toward either the barrel or the friction-drum, a key operating to fix either one of the detachable pinions on the shaft, clutches on the barrel and drum respectively adapted to couple the same with said loose wheel, a brake applicable to the barrel, a brake applicable to the friction-drum, and suitable levers for actuating said key, clutches, and brakes, substantially as described.

12. The combination, with a driving-shaft that may turn continuously in one direction, of a pinion adapted to be revolved thereby, a sleeve loosely mounted on said shaft, a gear carried by said sleeve and geared with said pinion, an internal gear in mesh with the gear of said sleeve, a wheel loose on the sleeve, means for rigidly connecting the wheel with the sleeve, and means for rigidly connecting said internal gear and causing it to revolve with the driving-shaft, substantially as described.

13. The combination, with a driving-shaft that may turn continuously in one direction, of a pinion revoluble therewith, a sleeve loose on said shaft, a gear carried by said sleeve and geared with said pinion, an internal gear engaged by the gear of said sleeve, a wheel loosely mounted on the sleeve and adapted to be revolved thereby, and means operating to hold said internal gear stationary while the driving-shaft is turning, substantially as described.

14. The combination, with a driving-shaft that may turn continuously in one direction, of a pinion adapted to be revolved thereby, a sleeve mounted loosely on said shaft, a gear carried by said sleeve and geared with said pinion, an internal gear engaging the gear of said sleeve, a wheel loose on the sleeve and means for rigidly connecting said sleeve so as to revolve with said internal gear, and means for holding the sleeve stationary while the shaft is turning, substantially as described.

15. The combination with a single driving-shaft, of a loose sleeve, gears carried by said sleeve, two pinions loosely mounted on said shaft each in gear with one of said gears on the sleeve, a barrel, gears carried by said barrel and geared with said gears on the sleeve, means for attaching either of said pinions to said shaft to rotate therewith, means for transmitting motion from said sleeve, and means for holding the barrel, substantially as described.

16. The combination with a single driving-shaft, of a loose sleeve, gears carried by said sleeve, two pinions mounted on said shaft each in gear with one of said gears on the sleeve, a barrel, gears carried by said barrel and geared with said gears on the sleeve, means for attaching either of said pinions to the shaft to rotate therewith and detaching the other pinion from the shaft, and means for holding the barrel from rotation, substantially as described.

Signed by me at San Francisco, California, this 20th day of January, 1900.

GEORGE W. WALTENBAUGH. [L. S.]

Witnesses:
A. H. STE. MARIE,
JOHN P. CASHIN.